(12) United States Patent
Anderson et al.

(10) Patent No.: US 6,598,123 B1
(45) Date of Patent: Jul. 22, 2003

(54) SNOOP FILTER LINE REPLACEMENT FOR REDUCTION OF BACK INVALIDATES IN MULTI-NODE ARCHITECTURES

(75) Inventors: James R. Anderson, Cambridge, MA (US); Doddaballapur N. Jayasimha, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 95 days.

(21) Appl. No.: 09/606,848

(22) Filed: Jun. 28, 2000

(51) Int. Cl.[7] .............................................. G06F 12/00
(52) U.S. Cl. ...................... 711/133; 711/146; 711/141; 711/147; 711/159; 711/136
(58) Field of Search ................................ 711/117, 120, 711/136, 143, 146, 141, 147, 148, 159, 160

(56) References Cited

U.S. PATENT DOCUMENTS 5,713,004 A * 1/1998 Kimmel et al. ............. 711/121
5,715,427 A * 2/1998 Barrera et al. ............... 711/136
5,809,528 A * 9/1998 Miller et al. ................. 711/118
5,913,226 A * 6/1999 Sato ............................ 711/141
5,966,729 A * 10/1999 Phelps ........................ 711/124
6,023,747 A * 2/2000 Dodson ....................... 711/118
6,275,909 B1 * 8/2001 Arimilli et al. .............. 711/146
6,304,945 B1 * 10/2001 Koenen ....................... 711/141
6,370,622 B1 * 4/2002 Chiou et al. ................. 180/169

* cited by examiner

*Primary Examiner*—Matthew Kim
*Assistant Examiner*—Zhuo H. Li
(74) *Attorney, Agent, or Firm*—Blakely, Sokoloff, Taylor & Zafman LLP

(57) ABSTRACT

A snoop filter in a multi-processor system maintains a plurality of entries, each representing a cache line that may be owned by one or more nodes. When replacement of one of the entries is required, the snoop filter selects for replacement the entry representing the cache line or lines owned by the fewest nodes, as determined from a presence vector in each of the entries. A temporal or other type of algorithm is used to refine the selection if more than one cache line is owned by the fewest number of nodes.

23 Claims, 5 Drawing Sheets

SNOOP FILTER LINE REPLACEMENT FOR REDUCTION OF BACK INVALIDATES IN MULTI-NODE ARCHITECTURES

FIELD OF THE INVENTION

The present invention pertains to snoop filters used in multi-processor systems. More particularly, the present invention relates to a technique for replacing cache line entries in a snoop filter so as to reduce back invalidates in a multi-node architecture.

BACKGROUND OF THE INVENTION

A snoop filter is a device used to reduce bus traffic in certain computer systems, particularly multiple-processor ("multi-processor") systems. In a multi-processor system, the snoop filter generally forms part of an interface between two or more "nodes". Each node contains one or more processors, a node controller, and memory, including one or more levels of cache memory associated with each processor. The snoop filter is essentially a specialized cache for tracking cache coherency state information relating to the cache memories of the processors. The snoop filter keeps track of the coherency state of each cache line of each of the processors. The state information is used by the snoop filter to decide which bus transactions received from the various nodes need to be passed on to other nodes in the system. The snoop filter filters unnecessary bus transactions by preventing them from reaching those nodes for which they are not needed. Hence, a snoop filter can have a dramatic positive impact on the overall system performance by reducing bus traffic.

FIG. 1 shows an example of a four-node, eight-processor system 1. The four nodes 2 ("node#0", "node#1", "node#2", and "node#3") are coupled to each other through a multi-node interface 10, which includes a snoop filter 5 and a switch 9. The switch 9 controls the routing of communications traffic between nodes 2. Each node 2 includes two processors 3 coupled on a local bus 8. The two processors 3 of each node 2 are also coupled to a Random Access Memory (RAM) 4 of that node through a node controller 6. The node controller 6 of each node 2 is coupled to the snoop filter 5. In addition, associated with each processor 3 is a cache memory (or "cache") 7. The caches 7 may be located within their respective processors 3, or they may be separate from but coupled to their respective processors 3 (e.g., off-chip or outside the processor but on the same chip).

Now consider a simple example of how the snoop filter 5 conserves bus bandwidth for the four-node system. Assume that a particular cache line, address A, is present only in one node of the system, node#0. If a processor 3 in node#3 wants to write to this cache line, the request first comes to the snoop filter 5, and the. snoop filter 5 will send an invalidation request only to node#0, since that cache line is only resident in node#. The request is "filtered", i.e., not forwarded to the two remaining nodes, node#1 or node#2, eliminating unnecessary transactions on the local buses 8 of node#1 and node#2.

Because the cache lines of each processor 3 have an entry in the snoop filter 5, the snoop filter 5 will send a "back invalidate" when it is forced to replace a snoop filter entry that corresponds to a valid entry in some processor's cache 7. A back invalidate is simply a signal to one or more nodes 2 to invalidate, in their caches 7, the line that has been replaced in the snoop filter. Continuing the example above, if the entry corresponding to cache line address A is replaced, a back invalidate signal is sent to node#3 before the snoop filter entry is allocated to a new cache line. When a node 2 receives a back invalidate signal, the node 2 marks that cache line as invalid. If another access is made to the cache line that was invalidated, a miss will occur and the accessing processor 3 will be forced to send a bus request to reread the line.

In this way, back invalidates from a snoop filter increase bus traffic and can cause cache misses. Known snoop filter replacement methods do not address this problem adequately. A conventional method for choosing a replacement line in a snoop filter is to use a temporal-based replacement algorithm such as Least Recently Used (LRU). In LRU, the oldest entry is chosen for replacement based on the premise that if the line has not been accessed recently, it is unlikely to be accessed in the near future. Other temporal-based algorithms, such as Pseudo-LRU (PRLU) or First In First Out (FIFO), work in a similar manner but are less expensive to implement. However, known temporal-based algorithms suffer from the same limitation, i.e., the lack of temporal information available to the snoop filter. This lack of temporal information stems from the fact that the snoop filter is only updated on cache misses. The snoop filter is unaware of cache hits and thus receives only a fraction of the temporal information available in the cache. Perhaps more importantly, the temporal correlation between the access streams from different processors in a multi-node architecture is weak at best.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for replacing entries in a snoop filter are described. Note that in this description, references to "one embodiment" or "an embodiment" mean that the feature being referred to is included in at least one embodiment of the present invention. Further, separate references to "one embodiment" in this description do not necessarily refer to the same embodiment; however, neither are such embodiments mutually exclusive, unless so stated and except as will be readily apparent to those skilled in the art.

As described in greater detail below, a snoop filter in a multi-processor system is configured to reduce the number of back invalidates that would otherwise be required, thereby reducing bus traffic and cache misses. The replacement technique is therefore referred to hereinafter as the Reduce Back Invalidates (RBI) technique. The snoop filter maintains a plurality of entries, each representing a cache line that may be owned by one or more nodes. When replacement of one of the entries is required, the snoop filter selects for replacement the entry representing the cache line owned by the fewest nodes, as determined from a presence vector in each of the entries. A temporal based algorithm may be used to refine the selection if more than one cache line is owned by the fewest number of nodes. That is, a greater or fewer number of nodes and/or processors-per-node may be used.

Figure 1:
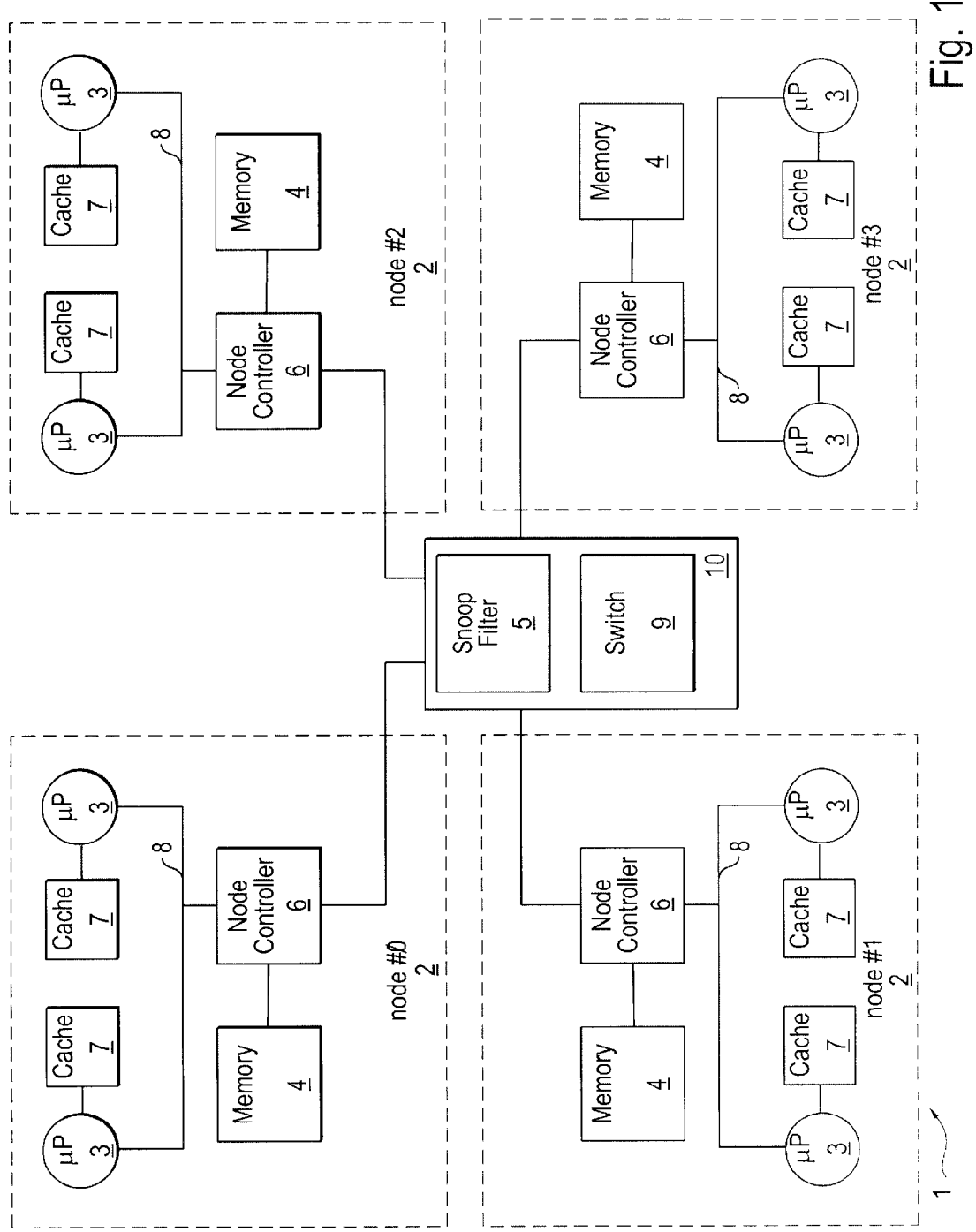
FIG. 1 is a block diagram of a multi-processor system that includes a snoop filter.

A snoop filter employing the RBI replacement technique can be used in a multi-processor system such as shown in FIG. 1. Note the processors 3 may be conventional general-purpose, programmable microprocessors. Alternatively, the processors 3 may be any of various other types of processing device, such as programmable Digital Signal Processors (DSPs) or Application Specific Integrated Circuits (ASICs). The caches 7 referred to herein may be assumed to be off-chip (e.g., "L3") caches. In other embodiments, however, the caches 7 may be on-chip (e.g., "L1" or "L2") caches. In addition, note that a multi-processor system that incorporates the RBI replacement technique does not have to be a four-node system, nor is a "node" required to have two processors for use with the RBI technique.

Figure 2:
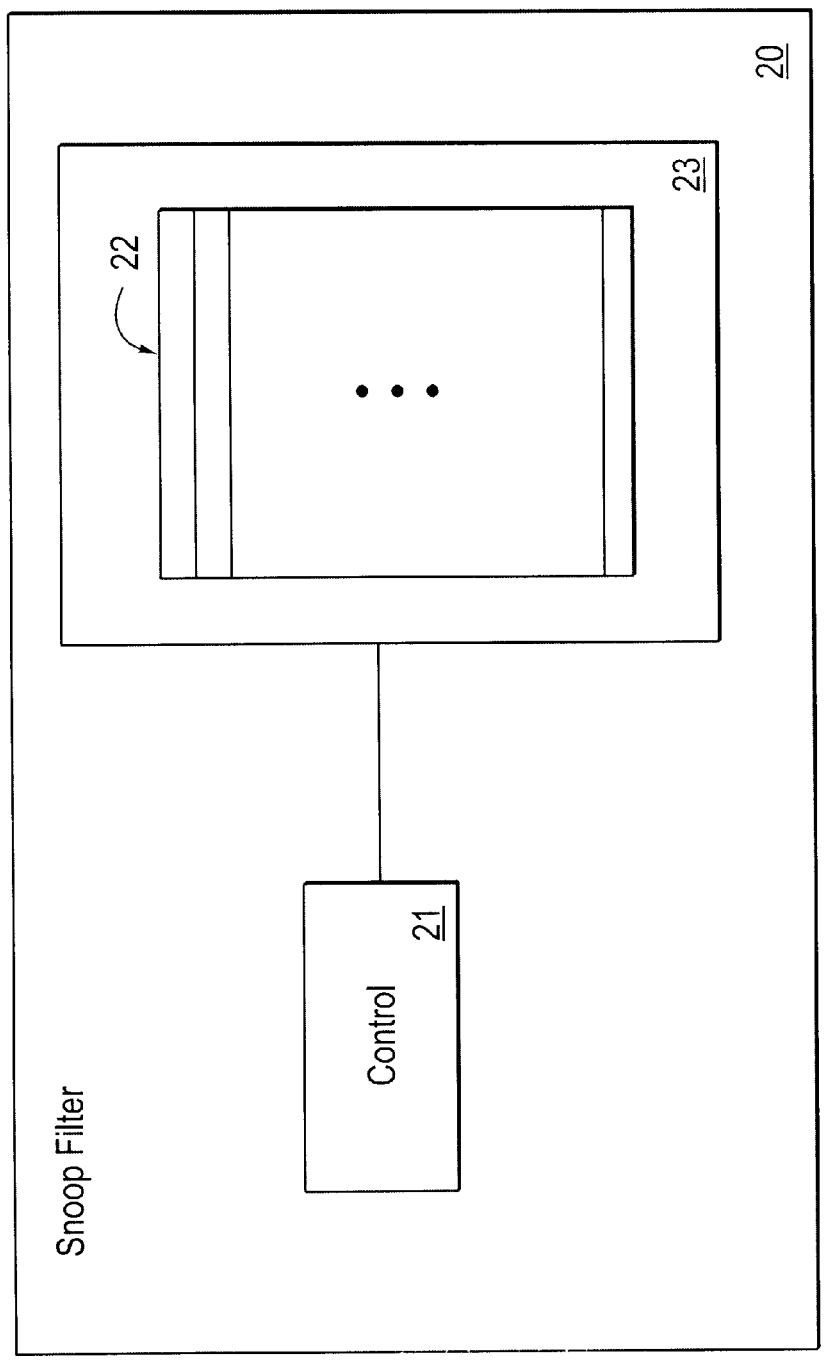
FIG. 2 is a block diagram of a snoop filter.

FIG. 2 is a block diagram of a snoop filter 20 that may employ the RBI replacement technique. The snoop filter 20 includes a control circuit 21 and memory 23 coupled to the control circuit 21. Memory 23 may be, for example, Content-Addressable Memory (CAM). Memory 23 stores a number of cache line entries 22, each representing a cache line "owned" by (resident in the caches of) zero or more of the nodes in the system. Note that "ownership" of a cache line, as the term is used herein, does not necessarily imply exclusive ownership by one node; that is, a cache line may be owned by multiple nodes. Similarly, an invalid cache line is considered to be owned by zero nodes. The control circuit 21 is configured to control the filtering of bus transactions based on the entries 22, as well as to control transmission of invalidates and back invalidates and replacement of snoop filter entries 22 when required.

Figure 3:
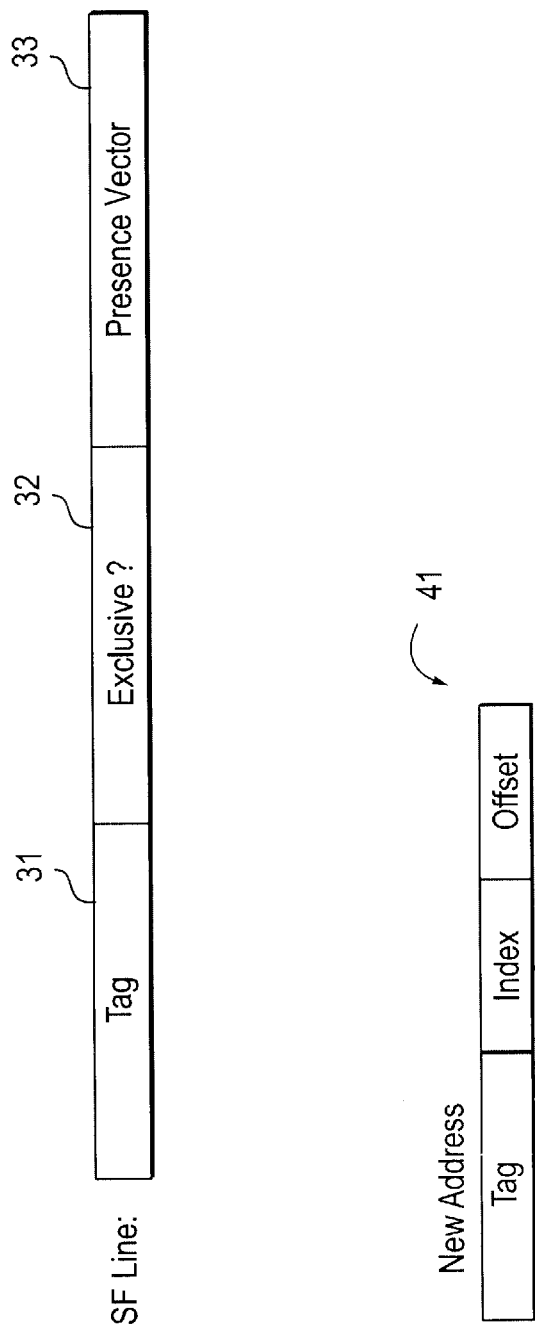
FIG. 3 shows the format of a snoop filter entry.

FIG. 3 shows the format of each snoop filter entry The snoop filter includes essentially a directory of which nodes have a copy of a particular cache line. In one embodiment, the snoop filter operation is based on the Modified, Exclusive, Shared and Invalid (MESI) coherency protocol. As shown in FIG. 3, each entry includes a tag field 31, an "exclusive" bit 32, and a presence vector 33. The tag field 31 is an address tag that identifies a particular cache line. The presence vector 33 indicates in which nodes a particular cache line is present. In one embodiment, the presence vector includes one bit for each of the nodes, and the value of each bit indicates whether the cache line is owned by the represented node. The exclusive bit 32 indicates if the cache line is owned exclusively by a single node. In addition, the snoop filter may include LRU information for each snoop filter set.

Referring back to FIG. 1, consider again the example of writing to a cache. Assume again that a particular cache line, address A, is present only in node#0, and that the presence vector for that cache line entry in the snoop filter is, therefore, "0001". If a processor in node#3 now wants to write to this cache line, the snoop filter will send an invalidation request only to node#0, since the presence vector indicates that cache line A is only resident in that node. The request is not forwarded to node#1 or node#2. After the transaction has completed, the presence vector is updated to "1000", for example, to indicate that only node#3 has the line cached.

As noted above, temporal based snoop filter line replacement techniques, such as LRU or PLRU, have proven to be less than optimal in terms of reducing bus traffic and cache misses. Rather than simply choosing the oldest entry for replacement, a more optimal replacement technique is to choose the entry that is owned by the least number of nodes, or in other words, to choose the entry that has the least number of bits set in the presence vector. This approach, the RBI approach, reduces the number of back invalidates that must be sent back to the processors when the entry is replaced. This has at least two positive impacts on system performance. The first is reduction in bus bandwidth consumption. By reducing the number of back invalidates, the bus traffic due to back invalidates is reduced and bus bandwidth is conserved. The second is reduction in cache miss rate. By reducing the number of back invalidates, the number of cache lines that are invalidated due to back invalidates is reduced. This results in a lower cache miss rate, which also has the secondary effect of further reducing the required bus bandwidth.

Figure 4:
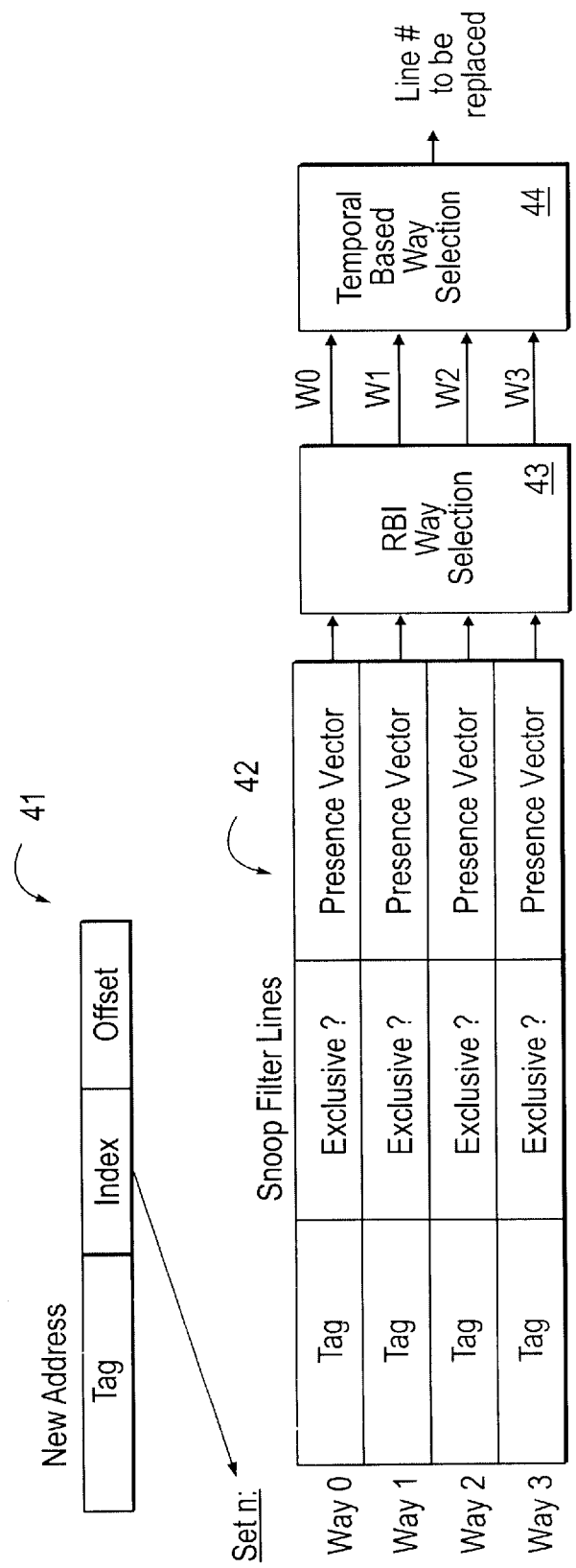
FIG. 4 illustrates the manner of selecting a snoop filter entry for replacement, using the Reduce Back Invalidates (RBI) technique, for a four-way associative snoop filter.

To improve the selection of an entry for replacement, an additional selection stage that reduces back invalidates is added to the snoop filter replacement selection hardware (in control circuit 21) to improve system performance. FIG. 4 illustrates the selection of an entry to be replaced for a four-way associative snoop filter. The nth set 42 is depicted, which contains four "ways" (entries or "lines"), i.e., way#0, way#1, way#2, and way#3. An RBI Way Selection stage 43 is placed before a temporal-based way selection stage 44. The RBI Way Selection stage 43 contains the additional hardware and/or software required to implement the RBI replacement line selection method. The RBI Way selection stage 43 may comprise programmable logic and/or hardwired-circuitry or a combination thereof, which may embody combinational logic and/or sequential logic.

When an entry in the snoop filter must be replaced, the index from the new address 41 (i.e., the address that will be used to replace the entry in the snoop filter) is used to select the set number within the snoop filter. If the snoop filter is associative, one of the entries within the set must be chosen for replacement. In the RBI method, the entry or entries with the least number of presence vector bits that are set (in the selected set) are selected for replacement by stage 43. If a tie occurs between multiple entries, then in one embodiment, a simple temporal-based selection algorithm is applied by stage 44 to pick a single line. Because temporal information is so weak in the snoop filter, a less-expensive algorithm, such as a random or FIFO selection, can even be used to break ties. Alternatively, any of various other techniques may be used to handle a tie between multiple entries, such as the techniques described below.

For the four-way associative snoop filter of FIG. 4, the RBI selection stage 43 has an output signal for each of the four entries in the set, i.e., signals W0 to W3. The output signal for a particular entry is active if the line has a presence vector with the fewest bits set. If VX represents the presence vector for a given way, WayX, and $\Sigma VX$ is the number of presence vector bits that are set for WayX, then the state of signal W0 may be determined according to the following pseudo-code (where "!=" represents "not equal to"):

If (($\Sigma V0$=0) OR (($\Sigma V0$=1) AND ($\Sigma V1$!=0) AND ($\Sigma V2$!=0) AND ($\Sigma V3$!=0)) OR (($\Sigma V0$=2) AND ($\Sigma V1 \geq 2$) AND ($\Sigma V2 \geq 2$) AND ($\Sigma V3 \geq 2$)) OR (($\Sigma V0$=3) AND ($\Sigma V1 \geq 3$) AND ($\Sigma V2 \geq 3$) AND ($\Sigma V3 \geq 3$)) OR $((\Sigma V0=4)$ AND $(\Sigma V1=4)$ AND $(\Sigma V2=4)$ AND $(\Sigma V3=4)))$
Then W0=On
Else W0=Off The manner of determining the state of signals W1 to W3 is similar, as will be readily apparent to those skilled in the art. Using the information on potential candidates for replacement that is provided by the W0 to W3 output, the temporal-based selection stage 44 breaks ties among multiple lines and provides a single entry number for replacement.

Figure 5:
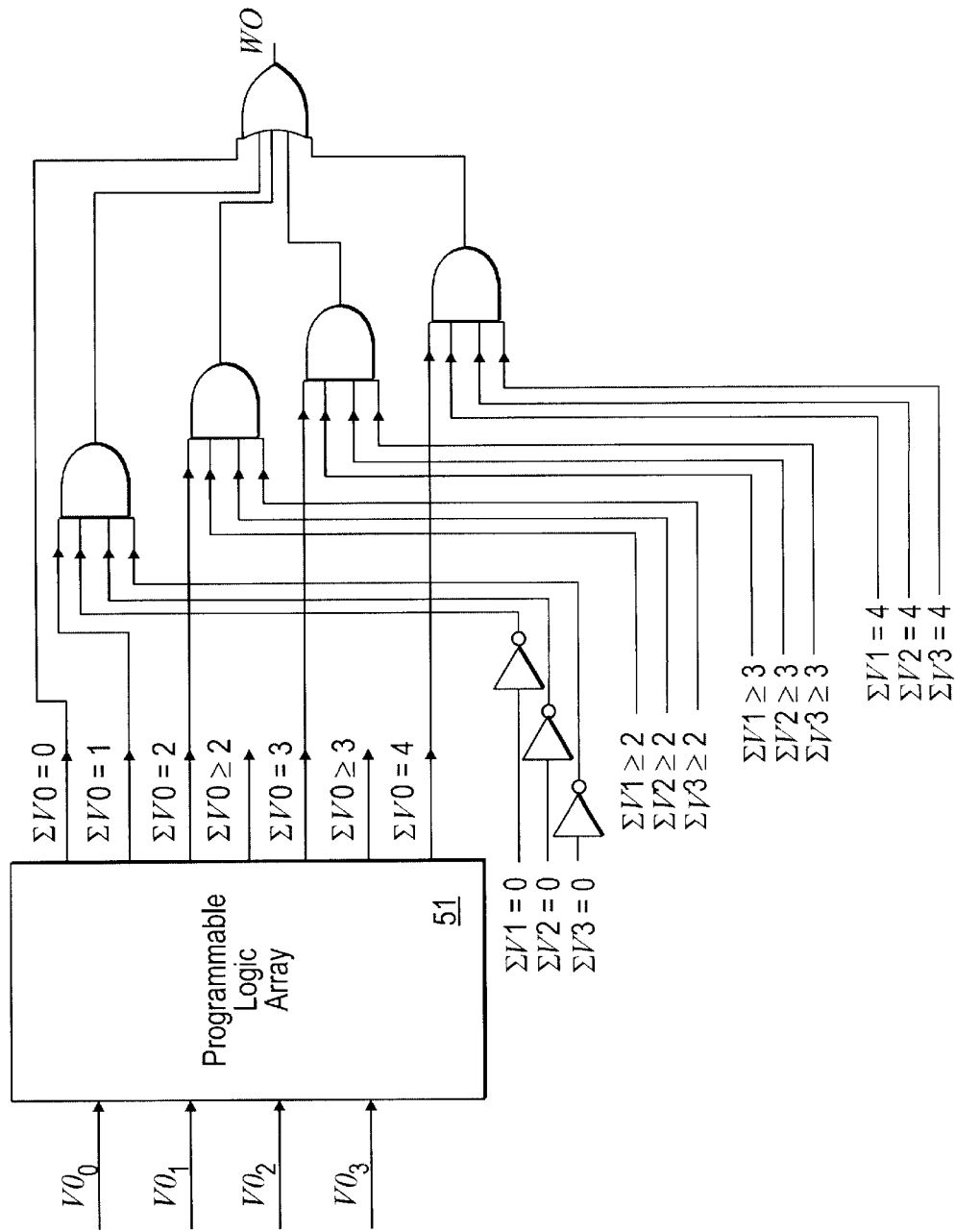
FIG. 5 shows a hardware implementation of the RBI technique for a four-way associative snoop filter.

FIG. 5 shows an implementation of this technique, where V0i ($1 \leq i \leq 4$) represents the presence bit of Way 0). In FIG. 5, the Programmable Logic Array (PLA) block 51 is a simple, 2-stage combinational circuit which implements the logic to generate the seven outputs as a function of the four inputs corresponding to the presence vector for each way. The outputs W1, W2, and W3 are not shown, but they can be generated in the same manner as W0. Using the information on potential candidates for replacement that is provided by the W0 to W3 outputs, the second stage of selection, i.e., the temporal-based selection stage, breaks ties among multiple lines and provides a single line number for replacement. Note that while FIG. 5 shows a combinational logic implementation, the RBI technique can alternatively be implemented using sequential logic.

Figure 6:
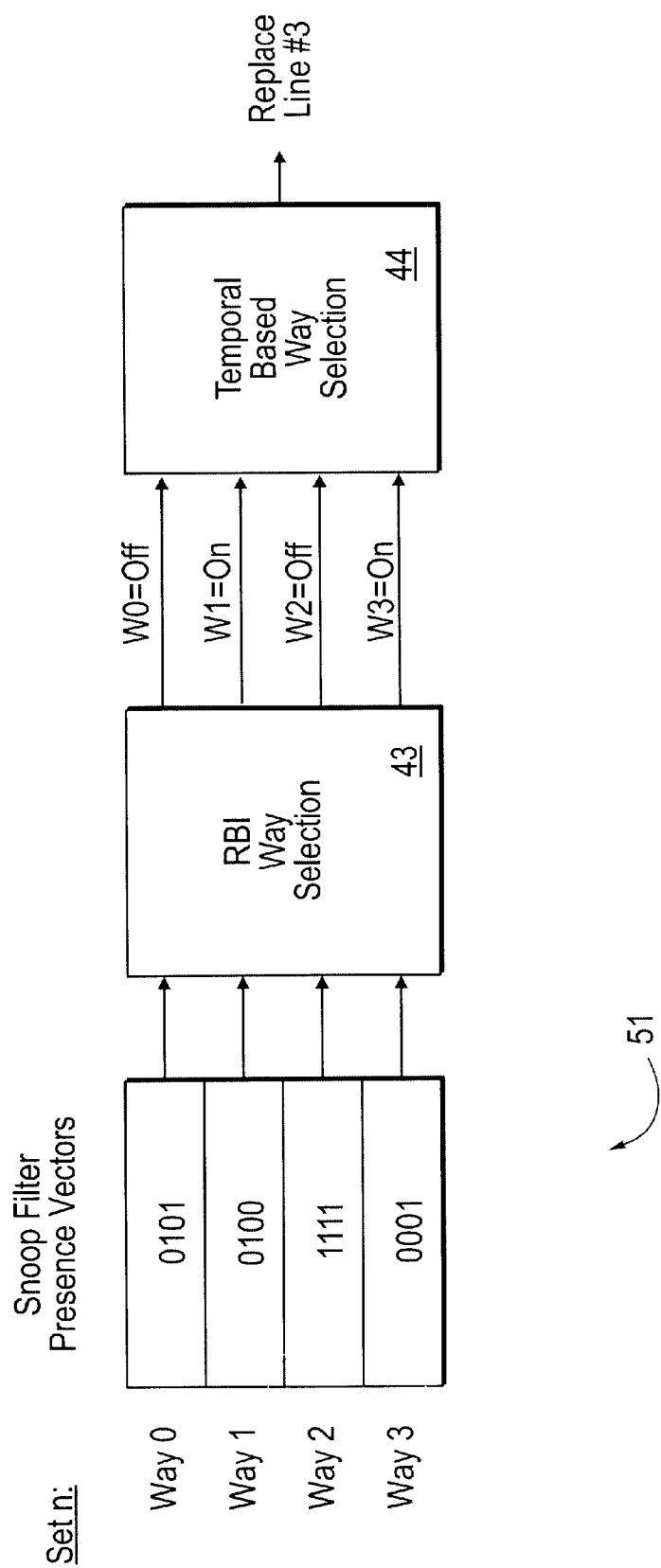
FIG. 6 shows an example of applying the RBI technique in a four-way, four-node system.

Assuming a four-way snoop filter and a four-node multiprocessor system (four nodes requires four bits for each presence vector, i.e. one bit to track the state of the line for each node), FIG. 6 shows an example of how the RBI replacement technique works. Assuming the presence vectors 51 are in the state shown in FIG. 6, the RBI selection stage 43 would turn on signals W1 and W3, because way#1 and way#3 each have only one presence vector bit set, and there are no other presence vectors with fewer bits set. Thus, way#1 and way#3 are chosen as potential replacement candidates, since replacement of one of these two lines would require the least number of back invalidates to be issued to the system. The temporal-based selection stage 44 then chooses between way#1 and way#3 using any number of conventional temporal-based selection techniques, such as LRU or PLRU. In this example, the temporal-based selection stage 44 chooses to replace the third line.

Without the RBI selection stage 43, any of the four different entries may have been chosen for replacement. For example, if way#2 was the oldest entry and was chosen for replacement by a temporal-based selection method, back invalidate transactions would need to be sent to all four nodes of the system (since its presence vector has all four bits set). This would result in four times as many bus transactions and cache line invalidations as choosing way#1 or way#3, which require only one back invalidate for replacement.

As noted above, the RBI technique is not restricted to use in a four-node system. For example, the RBI selection stage 43 can easily be implemented for more than four nodes. Hence in a four-way, eight-node system, the state of signal W0 may be determined according to the following pseudo-code:

If $((\Sigma V0=0)$ OR
$((\Sigma V0=1)$ AND $(\Sigma V1!=0)$ AND $(\Sigma V2!=0)$ AND $(\Sigma V3!=0))$ OR
$((\Sigma V0=2)$ AND $(\Sigma V1 \geq 2)$ AND $(\Sigma V2 \geq 2)$ AND $(\Sigma V3 \geq 2))$ OR
$((\Sigma V0=3)$ AND $(\Sigma V1 \geq 3)$ AND $(\Sigma V2 \geq 3)$ AND $(\Sigma V3 \geq 3))$ OR
$((\Sigma V0=4)$ AND $(\Sigma V1 \geq 4)$ AND $(\Sigma V2 \geq 4)$ AND $(\Sigma V3 \geq 4))$ OR
$((\Sigma V0=5)$ AND $(\Sigma V1 \geq 5)$ AND $(\Sigma V2 \geq 5)$ AND $(\Sigma V3 \geq 5))$ OR
$((\Sigma V0=6)$ AND $(\Sigma V1 \geq 6)$ AND $(\Sigma V2 \geq 6)$ AND $(\Sigma V3 \geq 6))$ OR
$((\Sigma V0=7)$ AND $(\Sigma V1 \geq 7)$ AND $(\Sigma V2 \geq 7)$ AND $(\Sigma V3 \geq 7))$ OR
$((\Sigma V0=8)$ AND $(\Sigma V1=8)$ AND $(\Sigma V2=8)$ AND $(\Sigma V3=8)))$
Then W0=On
Else W0=Off The manner of determining the state of the remaining signals WX is similar. It will be apparent that the benefit achieved by using the RBI technique increases as the number of processors in the system increases and/or the degree of sharing within the application increases.

The basic RBI technique relies on the information contained in the presence vectors to replace entries in the snoop filter. Numerous variations of this technique, especially in combination with the coherence state of the particular cache line, are possible. Four variations are now described. As indicated above, these variations may also be used to handle the case of a tie between multiple cache line entries (in terms of their node ownership).

In the first variation, in the case in which there is a tie with only a single presence bit set, the RBI technique will not choose any entry which has its cache line in the "Modified" state (i.e., "Exclusive?" is set). With this variation, a possible costly writeback to the memory is avoided.

Another variation arises when there is a tie with one or more presence bits set: the RBI algorithm first attempts to back invalidate a line whose home node is closest to the processor where the line currently exists. This variation reduces the memory latency when the processor requests the line that had been back invalidated.

Both of the above variations may require extra hardware to incorporate the extra logic. A variation which requires less hardware is next considered. With a large number of nodes, for example, implementation of the RBI illustrated in FIGS. 5 and 6 could be expensive. In such a case, a less expensive, approximate form of the selection code can be used with a negligible performance loss. In the eight-node example, the logic could be significantly simplified by combining adjacent ranges of values of $\Sigma VX$ as follows (again, for determining the state of signal W0):

If $((\Sigma V0=0)$ OR
$((\Sigma V0=1$ or $2)$ AND $(\Sigma V1!=0)$ AND $(\Sigma V2!=0)$ AND $(\Sigma V3!=0))$ OR
$((\Sigma V0=3$ or $4)$ AND $(\Sigma V1 \geq 3)$ AND $(\Sigma V2 \geq 3)$ AND $(\Sigma V3 \geq 3))$ OR
$((\Sigma V0=5$ or $6)$ AND $(\Sigma V1 \geq 5)$ AND $(\Sigma V2 \geq 5)$ AND $(\Sigma V3 \geq 5))$ OR
$((\Sigma V0=7$ or $8)$ AND $(\Sigma V1 \geq 7)$ AND $(\Sigma V2 \geq 7)$ AND $(\Sigma V3 \geq 7)))$
Then W0=On
Else W0=Off Again, the manner of determining the state of the remaining signals WX is similar. The RBI selection stage 43 can also be implemented for more or less than four-way associativity by simply changing the number of terms. For example, the following pseudo-code shows the manner of determining signal W0 for a five-way, four-node system (the "V4" terms have been added):

If $((\Sigma V0=0)$ OR
$((\Sigma V0=1)$ AND $(\Sigma V1!=0)$ AND $(\Sigma V2!=0)$ AND $(\Sigma V3!=0)$ AND $(\Sigma V4!=0))$
OR
$((\Sigma V0=2)$ AND $(\Sigma V1 \geq 2)$ AND $(\Sigma V2 \geq 2)$ AND $(\Sigma V3 \geq 2)$ AND $(\Sigma V4 \geq 2))$ OR $((\Sigma V0=3)$ AND $(\Sigma V1\geqq 3)$ AND $(\Sigma V2\geqq 3)$ AND $(\Sigma V3\geqq 3)$ AND $(\Sigma V4\geqq 3))$ OR $((\Sigma V0=4)$ AND $(\Sigma V1=4)$ AND $(\Sigma V2=4)$ AND $(\Sigma V3=4)$ AND $(\Sigma V4=4)))$ Then W0=On Else W0=Off The manner of determining the state of the remaining signals WX is similar.

Thus, a method and apparatus for replacing entries in a snoop filter have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A multi-processor system comprising:
   a plurality of nodes; and
   a snoop filter coupled to the plurality of nodes and including a plurality of entries, each entry representing a cache line owned by zero or more of the nodes, wherein the snoop filter is to selectively replace said entries based on the number of nodes that own the corresponding cache lines.

2. A multi-processor system as recited in claim 1, wherein each of the nodes includes a processor and a cache.

3. A multi-processor system as recited in claim 1, wherein the snoop filter is further to selectively replace said entries based on a temporal criterion in addition to the number of nodes that own the corresponding cache lines.

4. A snoop filter comprising:
   means for maintaining a plurality of entries, each representing a cache line owned by zero or more nodes of a plurality of nodes in a multi-processor system; and
   replacement means for selectively replacing said entries based on the number of nodes that own the corresponding cache lines.

5. A snoop filter as recited in claim 4, wherein the replacement means comprises means for selectively replacing said entries based on a presence vector.

6. A snoop filter as recited in claim 4, further comprising means for selectively replacing said entries based on the number of nodes that own the corresponding cache lines based on a temporal criterion.

7. A snoop filter comprising:
   a storage device containing a plurality of entries, each representing a cache line owned by zero or more nodes of a plurality of nodes in a multi-processor system, each entry including a presence vector indicating which of the nodes, if any, own the corresponding cache line; and
   a first selection circuit to select one or more of the entries when replacement of an entry is required, by selecting the entry or entries representing the cache line or lines, respectively, owned by the fewest nodes, based on the presence vectors of the entries.

8. A snoop filter as recited in claim 6, wherein only one of said one or more entries is an entry to be replaced.

9. A snoop filter as recited in claim 8, wherein two or more of the entries may be owned by the fewest nodes and selected by the first selection circuit, and wherein the snoop filter further comprises a second selection circuit to select the entry to be replaced from among the two or more of the entries selected by the first selection circuit, based on a temporal criterion.

10. A snoop filter as recited in claim 9, wherein the second selection circuit uses a Least Recently Used (LRU) based algorithm to select the entry to be replaced.

11. A multi-processor system comprising:
    a plurality of nodes, each of the nodes including a microprocessor coupled to a cache memory; and
    a snoop filter coupled to the plurality of nodes to filter bus transaction requests by the microprocessors, the snoop filter including a plurality of entries, each entry representing a cache line owned by zero or more of the nodes, wherein the snoop filter is to replace selected ones of said entries based on the number of nodes that own the corresponding cache lines.

12. A multi-processor system as recited in claim 11, wherein the snoop filter is further to replace said selected entries based on a presence vector of each of the entries.

13. A multi-processor system as recited in claim 12, wherein the snoop filter is further to replace said entries based on a temporal criterion.

14. A multi-processor system comprising:
    a plurality of nodes, each of the nodes including a microprocessor coupled to a cache memory; and
    a snoop filter coupled to the plurality of nodes to filter bus transaction requests by the microprocessors, the snoop filter including
       a storage device containing a plurality of entries, each representing a cache line owned by zero or more of the nodes, each entry including a presence vector including a bit for each of the nodes, each bit of the presence vector indicating whether the corresponding node owns the corresponding cache line, and
       a first selection circuit coupled to the storage device to select one or more of the entries when replacement of an entry is required, by selecting the one or more of the entries representing the one or more of the cache lines, respectively, that are owned by the fewest nodes based on the presence vectors of the entries.

15. A multi-processor system as recited in claim 14, wherein only one of said one or more entries is an entry to be replaced.

16. A multi-processor system as recited in claim 15, wherein two or more of the entries may be owned by the fewest nodes and selected by the first selection circuit, and wherein further comprising a second selection circuit to select the entry to be replaced from among two or more of the entries selected by the first selection circuit, based on a temporal criterion.

17. A multi-processor system as recited in claim 16, wherein the second selection circuit uses a Least Recently Used (LRU) based algorithm to select the entry to be replaced.

18. A method of replacing entries in a snoop filter, the method comprising:
    determining when replacement of an entry in the snoop filter is to be performed, the snoop filter containing a plurality of entries, each representing a cache line owned by zero or more nodes of a plurality of nodes in a multi-processor system; and
    selecting an entry, of the plurality of entries, representing the cache line that is owned by the fewest number of nodes in the multi-processor system, as the next entry to be replaced in the snoop filter.

19. A method as recited in claim 18, further comprising, if more than one of the entries is owned by the fewest number of nodes, using a temporal criterion to select only one of the entries representing the cache line that is owned by the fewest number of nodes, for replacement.

20. A method as recited in claim 18, wherein each of the entries includes a vector indicating which of the nodes, if any, own the cache line represented by the entry, and wherein said selecting comprises selecting the entry representing the cache line owned by the fewest number of nodes based on the vectors of the entries.

21. A method of operating a snoop filter, the method comprising:
- maintaining a plurality of entries, each representing a cache line owned by zero or more nodes of a plurality of nodes in a multi-processor system;
- determining that replacement of one of the entries is required;
- using an index field of an address to select a set of the plurality of entries, each of the entries of the set including a presence vector indicating which of the nodes, if any, own the cache line represented by the entry;
- from the selected set, selecting the one or more of the entries representing the one or more of the cache lines that are owned by the fewest number of nodes by using the presence vectors of said entries;
- if only one of the entries of the selected set is owned by the fewest number of nodes, selecting said one of the entries for replacement; and
- if more than one of the entries of the selected set is owned by an equal fewest number of nodes, using a temporal criterion to select only one of the entries that is owned by the fewest number of nodes, for replacement.

22. A method as recited in claim 21, wherein said using a temporal criterion to select only one of the entries that is owned by the fewest number of nodes comprises using a Least Recently Used (LRU) based algorithm to select only one of the entries that is owned by the fewest number of nodes, for replacement.

23. A method as recited in claim 21, wherein each of the presence vectors includes a plurality of bits, and wherein said selecting the one or more of the entries representing the one or more of the cache lines that are owned by the fewest number of nodes comprises selecting the one or more of the entries having the fewest number of set presence vector bits.

* * * * *